(12) United States Patent
Feng et al.

(10) Patent No.: US 9,613,460 B2
(45) Date of Patent: Apr. 4, 2017

(54) AUGMENTING A DIGITAL IMAGE

(71) Applicant: LENOVO (Singapore) PTE, LTD., New Tech Park (SG)

(72) Inventors: Xin Feng, Morrisville, NC (US); Paul Hilburger, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 88 days.

(21) Appl. No.: 14/274,347

(22) Filed: May 9, 2014

(65) Prior Publication Data
US 2015/0325049 A1    Nov. 12, 2015

(51) Int. Cl.
*G06T 19/00* (2011.01)
*G06F 17/30* (2006.01)

(52) U.S. Cl.
CPC ...... *G06T 19/006* (2013.01); *G06F 17/30244* (2013.01)

(58) Field of Classification Search
None
See application file for complete search history.

(56) References Cited

U.S. PATENT DOCUMENTS

| | | | |
|---|---|---|---|
| 6,759,979 B2* | 7/2004 | Vashisth | G01C 11/02 342/357.31 |
| 2004/0208372 A1* | 10/2004 | Boncyk | G06F 17/30256 382/181 |
| 2009/0265105 A1* | 10/2009 | Davis | G01C 21/20 701/300 |
| 2014/0015827 A1* | 1/2014 | Rapoport | G06T 11/60 345/419 |

* cited by examiner

*Primary Examiner* — Edward Martello
(74) *Attorney, Agent, or Firm* — Kunzler Law Group

(57) ABSTRACT

For augmenting a digital image, code identifies a structure image in a digital image. The code further augments the digital image with structure information for the structure image and/or the digital image with structure image removed.

12 Claims, 14 Drawing Sheets

AUGMENTING A DIGITAL IMAGE

BACKGROUND

Field

The subject matter disclosed herein relates to digital images and more particularly relates to augmenting digital images.

Description of the Related Art

Electronic devices are often used to capture a digital image. The digital image may include structure images.

BRIEF SUMMARY

An apparatus for augmenting a digital image is disclosed. The apparatus includes a camera, a display, a processor, and a memory. The display displays a digital image from the camera. The memory may store code that is executable by the processor. The code identifies a structure image in the digital image. The code further augments the digital image with an augmentation selected from the group consisting of structure information for the structure image and the digital image with structure image removed. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
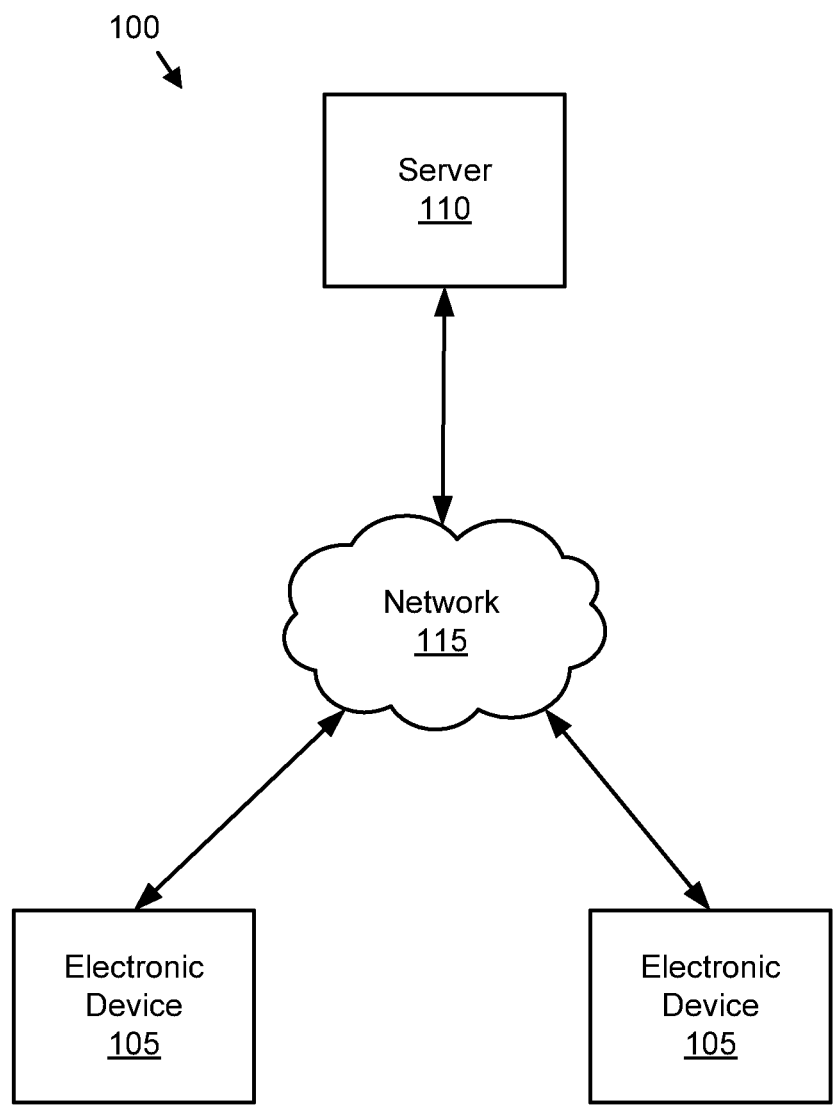
FIG. 1A is a schematic block diagram illustrating one embodiment of a digital image augmentation system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a digital image augmentation system 100. The system 100 includes one or more electronic devices 105, a server 110, and a network 115. The electronic devices 105 may be mobile phones, tablet computers, laptop computers, or the like. Alternatively, the electronic devices 105 may be security cameras, web cameras, and the like.

Each electronic device 105 may have a wireless connection with the network 115. The network 115 may be the Internet, a mobile telephone network, or the like. The wireless connection may also employ a Wi-Fi network based on any one of the Institute of Electrical and Electronics Engineers (IEEE) 802.11 standards. Alternatively, the wireless connection may be a BLUETOOTH® connection. In addition the wireless connection may employ a Radio Frequency Identification (RFID) communication including RFID standards established by the International Organization for Standardization (ISO), the International Electrotechnical Commission (IEC), the American Society for Testing and Materials (ASTM), the DASH7 Alliance, and EPC-Global.

Alternatively, the wireless connection may employ a ZigBee connection based on the IEEE 802 standard. In one embodiment, the wireless connection employs a Z-Wave connection as designed by Sigma Designs. Alternatively, the wireless connection may employ an ANT and/or ANT+ connection as defined by Dynastream Innovations Inc. of Cochrane, Canada.

The wireless connection may be an infrared connection including connections conforming at least to the Infrared Physical Layer Specification (IrPHY) as defined by the Infrared Data Association (IrDA). Alternatively, the wireless connection may be a cellular telephone network communication. All standards and/or connection types include the latest version and revision of the standard and/or connection type as of the filing date of this application.

The electronic devices 105 may communicate with the server 110 through the network 115. The server 110 may be embodied in a server farm. Alternatively, the server 110 may be embodied in a mainframe computer, a computer workstation, or the like.

Figure 1B:
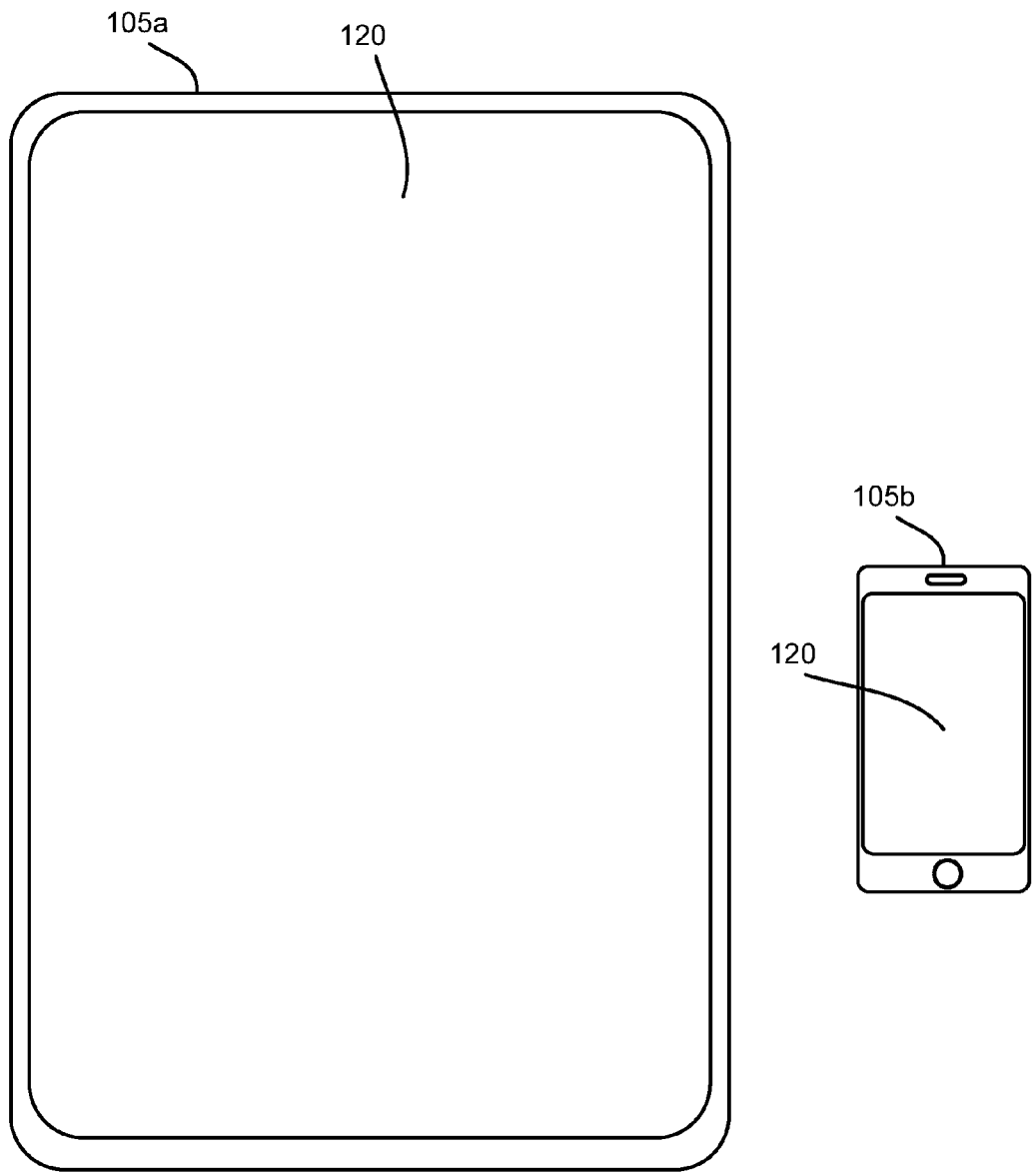
FIG. 1B is a front view drawing illustrating one embodiment of electronic devices.

FIG. 1B is a front view drawing illustrating one embodiment of the electronic devices 105 of FIG. 1A. In the depicted embodiment, the tablet computer electronic device 105a and a mobile telephone electronic device 105b are shown. Each electronic device 105 may include a display 120.

Figure 1C:
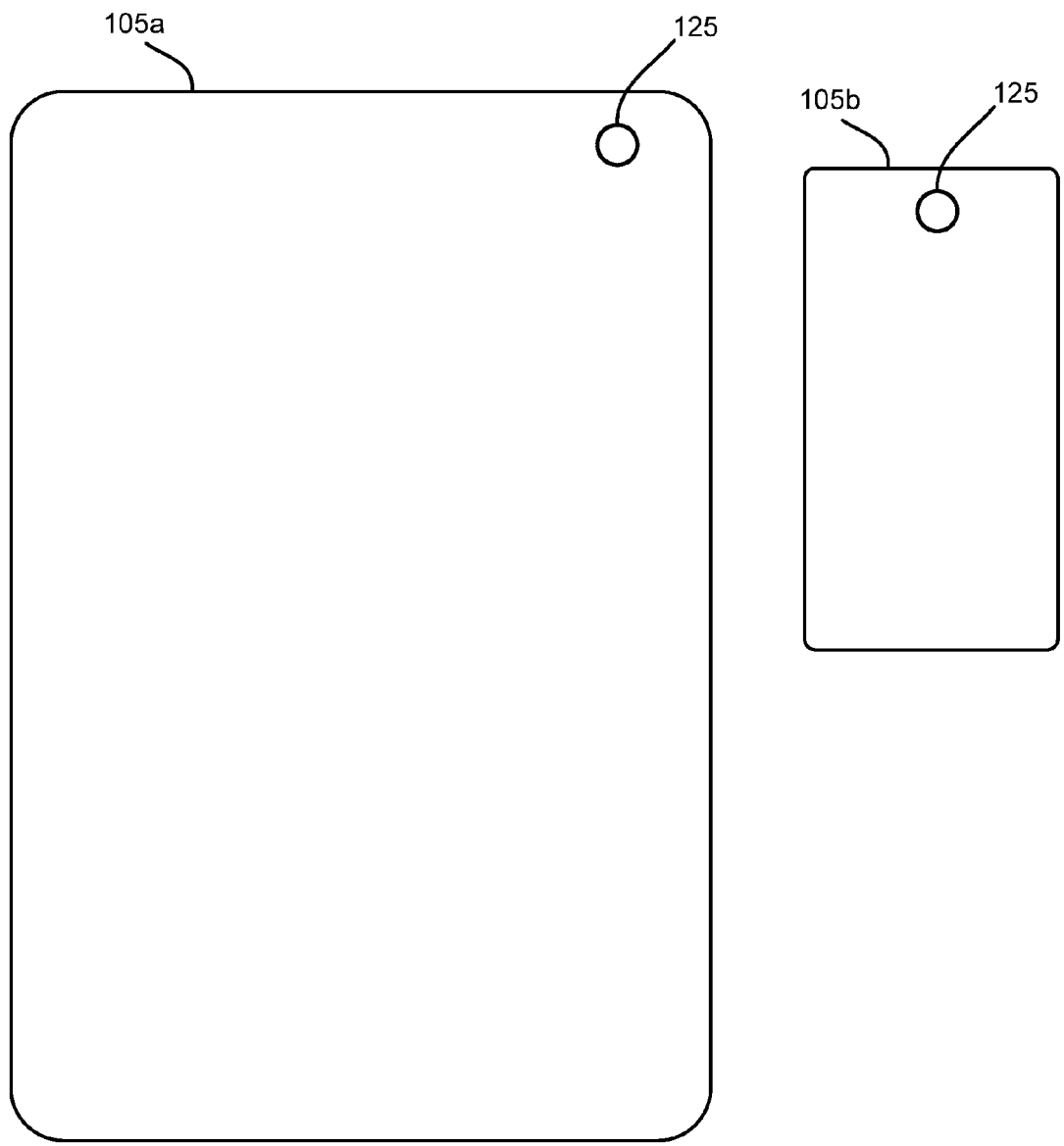
FIG. 1C is a back view drawing illustrating one embodiment of electronic devices.

FIG. 1C is a back view drawing illustrating one embodiment of the electronic devices 105 of FIGS. 1A-1B. The electronic devices 105s may include cameras 125. A user may employ the electronic device 105 to capture a digital image of the scene with the camera 125. The electronic device 105b may display the digital image on the display 120.

In the past, the digital image has been displayed as part of recording an image and/or video clip of the scene. However, the embodiments described herein augment the digital image, allowing the electronic device 105 to provide additional information as part of the digital image that is displayed to the user. In particular, the embodiments identify a structure image in the digital image. In addition, the embodiments augment the digital image with an augmentation.

For example, the user may wish to know the identity of a structure in the digital image. The user may select the structure image in the digital image. The embodiments may provide structure information for the structure image. Alternatively, the user may wish to view the scene without a structure image. The augmentation may be the digital image with the structure image removed as will be described hereafter.

Figure 2A:
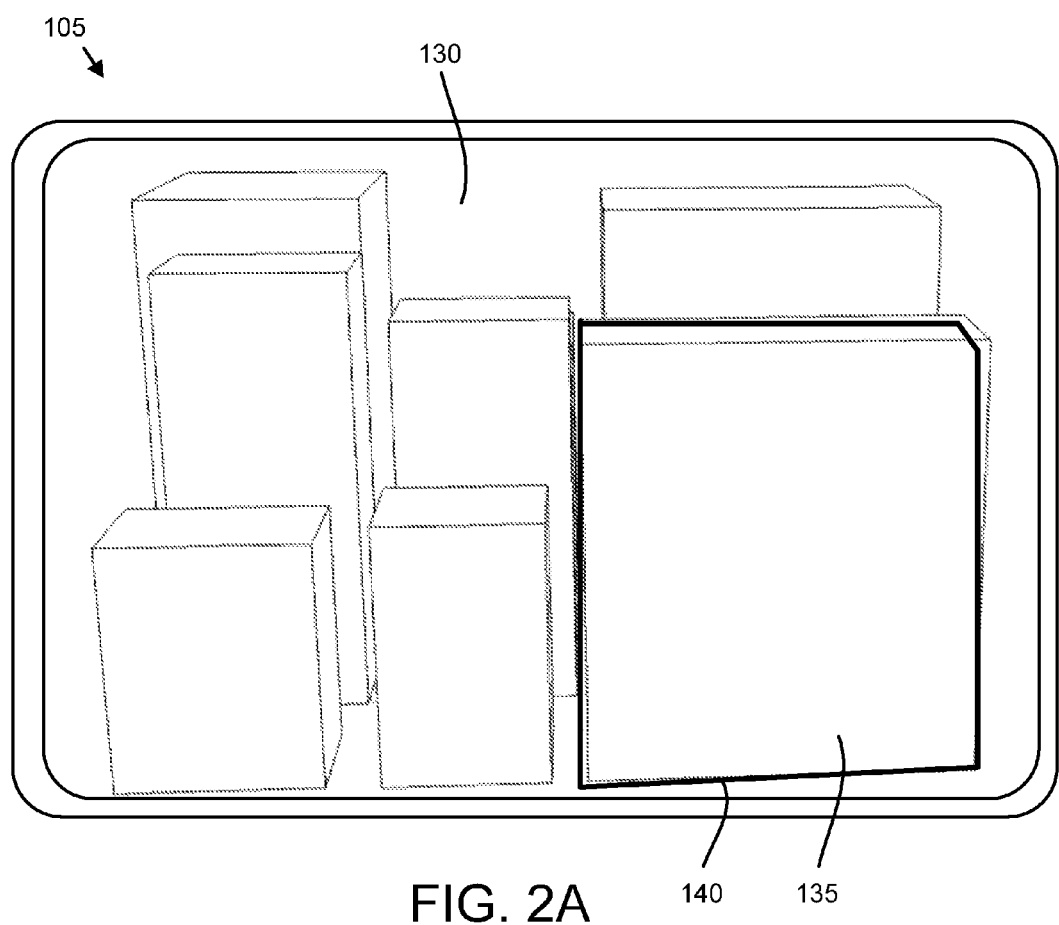
FIG. 2A is a front view drawing illustrating one embodiment of a digital image on an electronic device.

FIG. 2A is a front view drawing illustrating one embodiment of a digital image 130 on an electronic device 105. In the depicted embodiment, the electronic device 105 has captured a scene with the camera 125 as the digital image 130. The user may wish to learn more about a structure in the digital image 130. Alternatively, the user may wish to view the scene without a particular structure.

In one embodiment, the user selects a structure image 135. The user may select the structure image 135 by tapping on the structure image 135 on the display 130. Alternatively, the user may select the structure image 135 by outlining the structure image 135 on the display 130. In one embodiment, the user may employ a pointing device to select the structure image 135. In a certain embodiment, the user may employ the pointing device to outline the structure image 135.

The electronic device 105 may highlight the selected structure image 135. Alternatively, the electronic device may outline the selected structure image 135 with the border 140 as is shown.

Figure 2B:
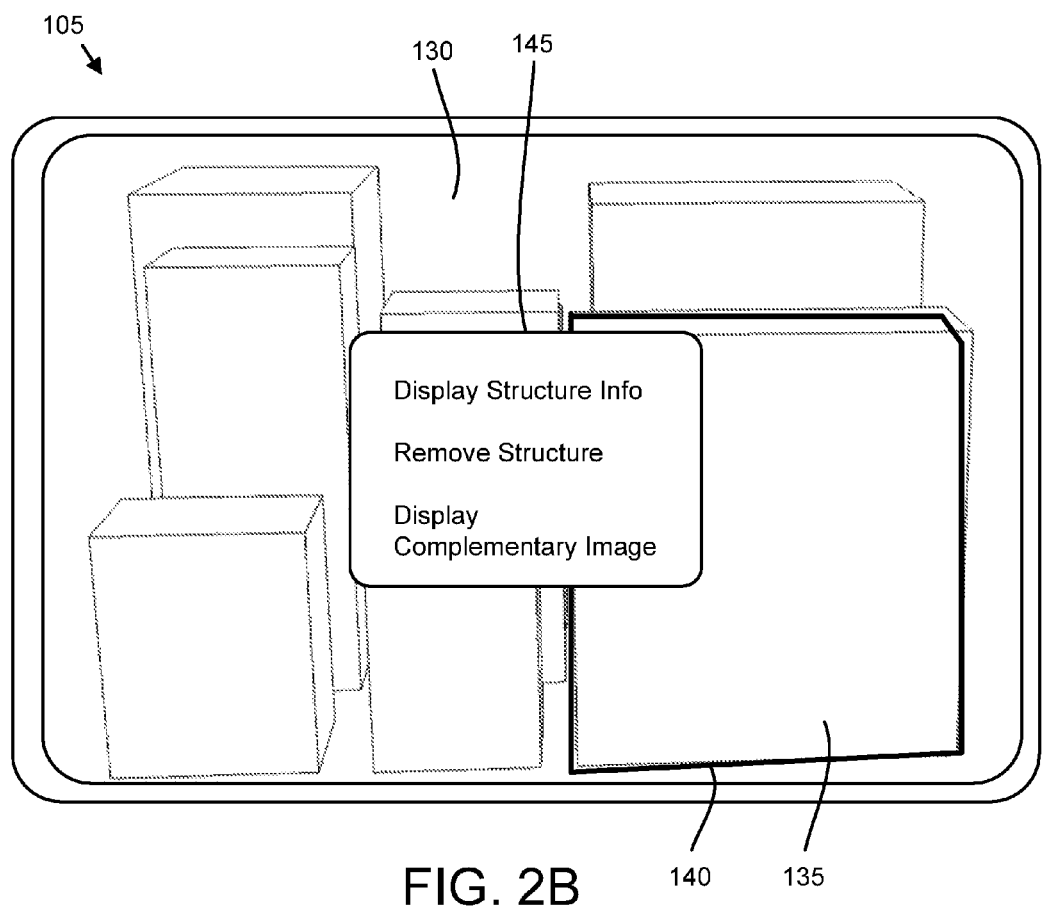
FIG. 2B is a front view drawing illustrating one embodiment of a digital image with augmentation options on an electronic device.

FIG. 2B is a front view drawing illustrating one embodiment of the digital image 130 with augmentation options 145 on the electronic device 105. In response to a user selecting the structure image 135, electronic device 105 may display the augmentation options 145. The user may select one of the augmentation options 145 and the electronic device 105 may augment the digital image 130 in response to the selected augmentation option 145.

In the depicted embodiment, the augmentation options 145 include displaying structure information, removing the structure image, and displaying a complementary image. The structure information may describe the structure image 135. The option to remove the structure may result in the electronic device 105 removing the structure image 135 from the digital image 130. The display complementary image option may cause the electronic device 105 to find one or more other complementary images of the scene from different points of view from one or more other electronic devices 105 and to add those complementary images to the digital image 130 as will be described hereafter.

Figure 2C:
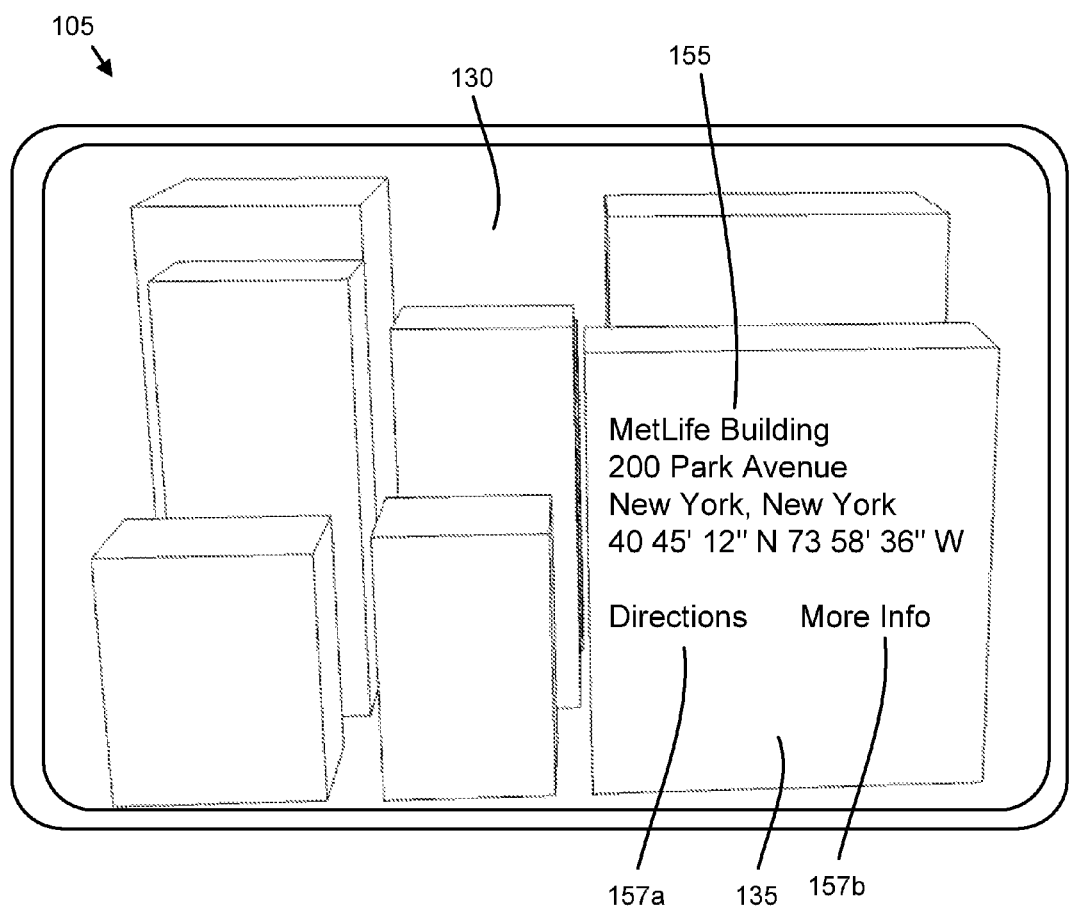
FIG. 2C is a front view drawing illustrating one embodiment of a digital image with structure information on an electronic device.

FIG. 2C is a front view drawing illustrating one embodiment of a digital image 130 with structure information 155 on the electronic device 105. In the depicted embodiment, the digital image 130 is augmented with structure information 155 for the selected structure image 135. The structure information 155 may be displayed in response to the user selecting the display structure information option of the augmentation options 145. The structure information 155 may comprise one or more of a structure name, a structure occupant, a structure use, a structure address, a structure coordinate, and a structure history. In addition, the structure information 155 may include a structure model. The structure model may show an interior layout of the structure. The structure image 135 may be augmented with the structure model.

In one embodiment, the structure information 155 includes information options 157. The user may select the information options 157 to access additional structure information 155 that is not initially displayed with the structure image 135 such as directions 157a and/or more information 157b.

Figure 2D:
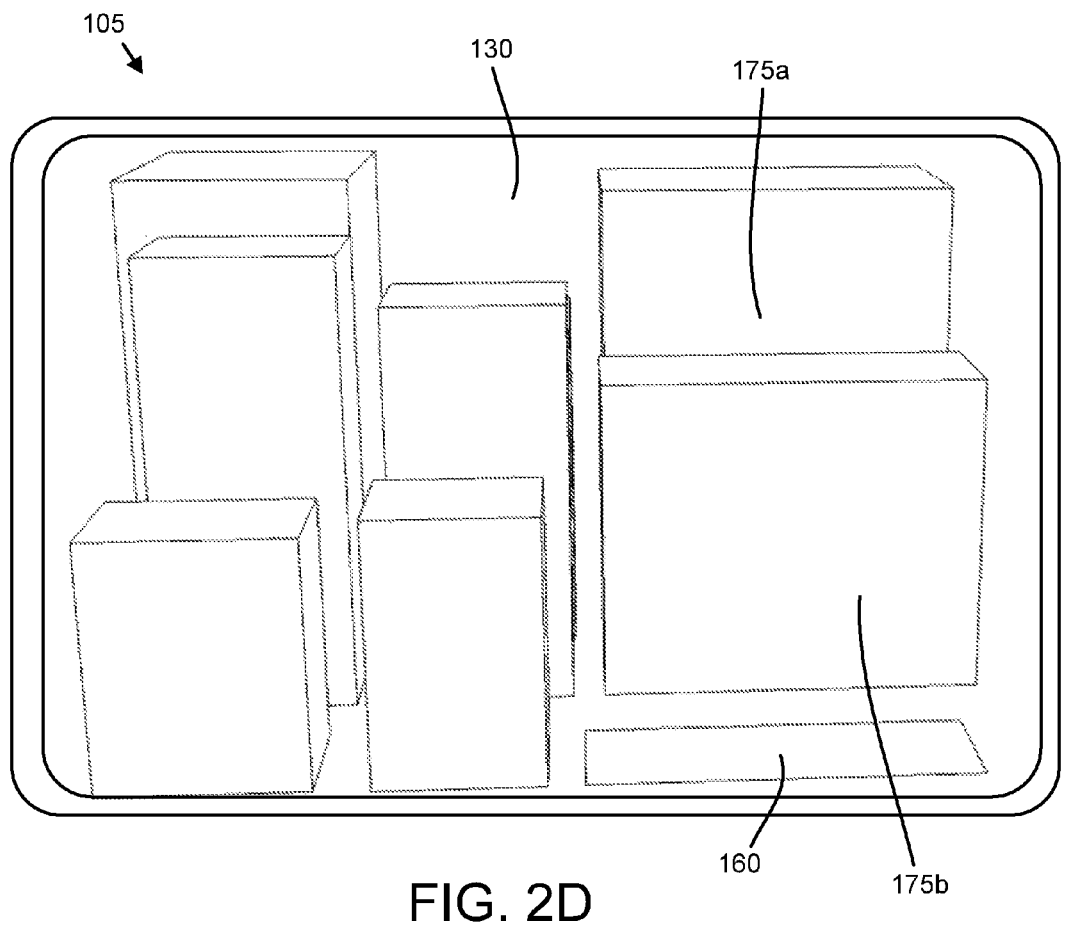
FIG. 2D is a front view drawing illustrating one embodiment of a digital image with a structure image removed on an electronic device.

FIG. 2D is a front view drawing illustrating one embodiment of a digital image 130 with the structure image 135 removed on the electronic device 105. In the depicted embodiment, the selected structure image 135 is removed from the digital image 130. The selected structure image 135 may be removed in response to the user selecting the removes structure augmentation option 145. In one embodiment, a structure footprint 160 of the selected structure image 135 may be displayed in place of the selected structure image 135.

The electronic device 105 may edit the selected structure 135 so that the selected structure image 135 is not displayed. In addition, structure reference images for structures that are behind the selected structure image 135 may be accessed in order to fill in the portions of the digital image 130 without pixel data. Generated structures 175 including entire structures 175b and portions of structures 175a may be added to the digital image 130 to display the portion of the scene obscured by the removed selected structure 135.

In one embodiment, a structure vector is generated to identify structures and/or portions of structures that are obscured by the removed selected structure 135. The structure vector may be generated from the structure image 135 and the position and orientation of the electronic device 105 as will be described hereafter for FIG. 4. Structure reference images may be retrieved for the obscured structures. The generated structures 175 may be generated from the structure reference images.

Alternatively, another electronic device 105 with a camera 125 that is viewing the obscured structures may be identified. A structure vector may be used to identify the other electronic device 105 from an electronic device database as will be described hereafter. A feed from the other electronic device camera 125 may be used to generate the generated structures 175.

Figure 2E:
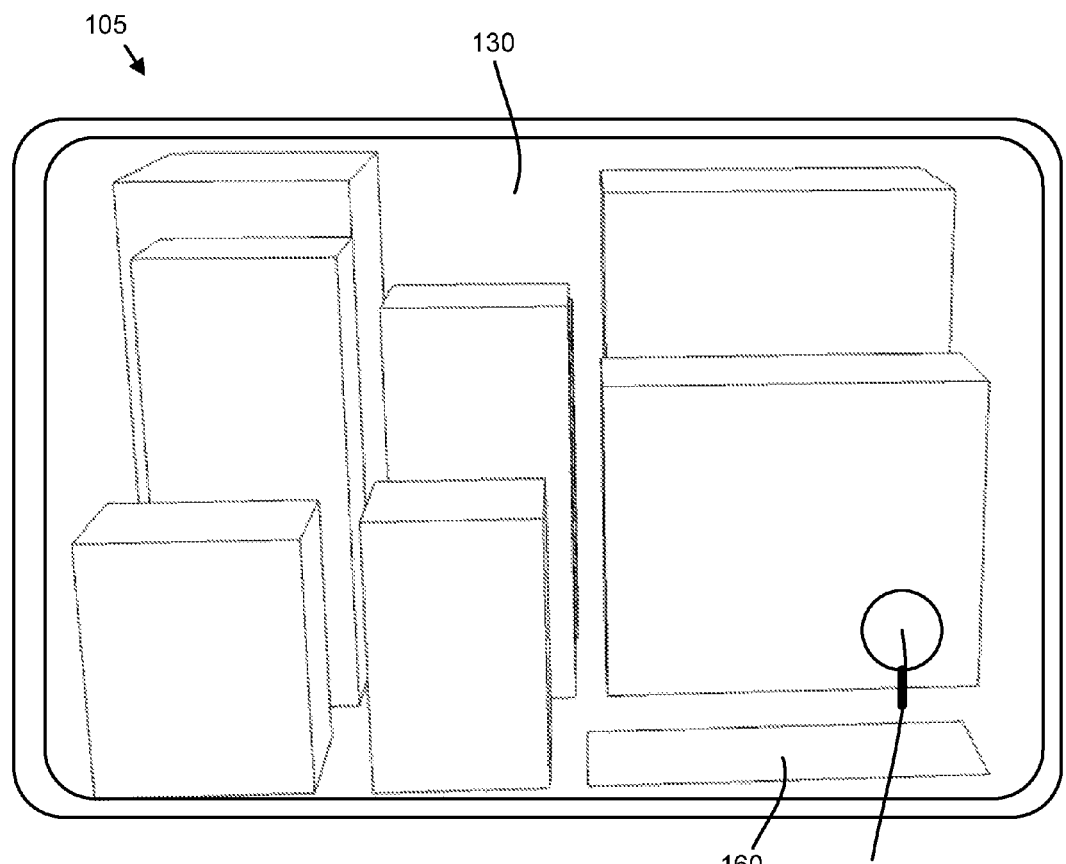
FIG. 2E is a front view drawing illustrating one embodiment of a digital image with a complementary image on an electronic device.

FIG. 2E is a front view drawing illustrating one embodiment of the digital image 130 with a complementary image 165 on the electronic device 105. In the depicted embodiment, the selected structure image 135 is removed from the digital image 130. In addition, a complementary image 165 of a tree is displayed in the digital image 130. The complementary image 165 may be displayed in response to the user selecting the display complementary image augmentation option 145.

In one embodiment, the structure vector may be used to identify another electronic device 105 in electronic device database that is capturing a portion of the scene obscured by the removed selected structure 135. A feed from the camera 125 of the other electronic device 105 may be used to generate the complementary image 165 and add the complementary image 165 to the digital image 130.

Figure 3A:
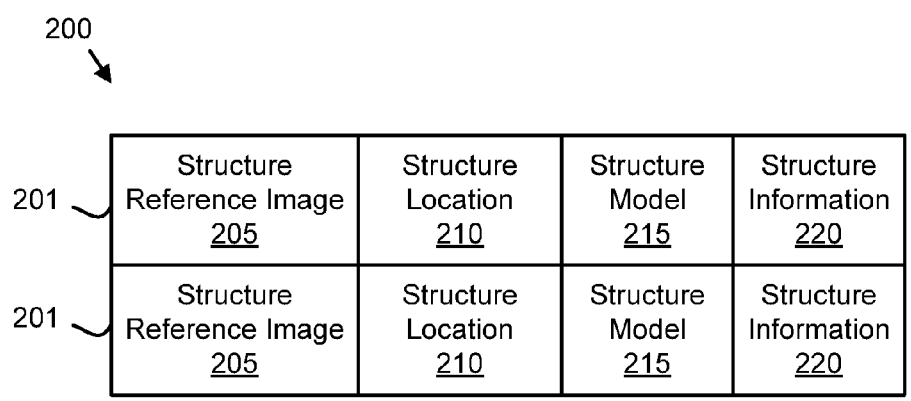
FIG. 3A is a schematic block diagram illustrating one embodiment of a structure database.

FIG. 3A is a schematic block diagram illustrating one embodiment of a structure database 200. The structure database 200 may comprise one or more tables storing entries 201. Each entry 201 may describe a structure. The structure database 200 may be stored on the server 110. Alternatively, the structure database 200 may be stored on the electronic device 105. In one embodiment, a localized portion of the structure database 200 may be stored on electronic device 105. For example, entries 201 for structures with a structure location 210 within a localization distance such as 5 kilometers of the electronic device 105 may be stored on the electronic device 105. In one embodiment, the localization distance is in the range of 500 to 5000 meters.

In one embodiment, an entry 201 includes a structure reference image 205, the structure location 210, a structure model 215, and structure information 220. The structure reference image 205 may include one or more images of the associated structure. In one embodiment, the images include a front image, a back image, left image, a right image, and the top image of the structure. The structure reference image 205 may be used to identify the selected structure 135. Alternatively, the structure reference image 205 may be used to create a generated structure 175 on the digital image 130.

The structure location 210 may include global positioning system (GPS) coordinates for the structure, dimensions of the structure, a street address for the structure, and the like. The structure model 215 may include a three-dimensional model of an interior of the structure, architectural drawings of the structure, interior images of the structure, or combinations thereof.

The structure information 220 may include the structure name, a structure occupant, a directory of the structure occupants, the structure use, the structure address, the structure GPS coordinates, and the structure history. The structure information 220 may also include links to additional information about the structure.

Figure 3B:
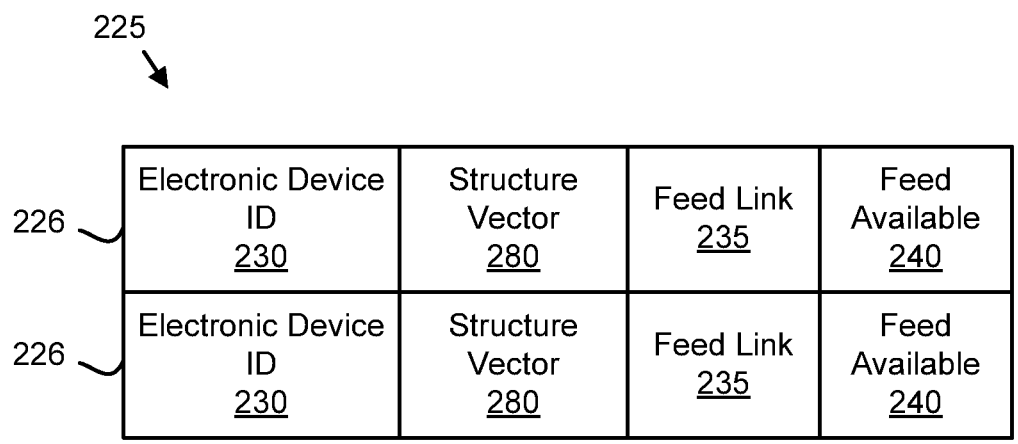
FIG. 3B is a schematic block diagram illustrating one embodiment of an electronic device database.

FIG. 3B is a schematic block diagram illustrating one embodiment of an electronic device database 225. The electronic device database 225 may be organized as one or more tables with entries 226 for each electronic device 105. The electronic device database 225 may be stored on the server 110. In addition, a localized portion of the electronic device database 225 may be stored on the electronic device 105. In one embodiment, each entry 226 with a structure vector 280 originating within the localization distance of the electronic device 105 may be stored on the electronic device 105.

In the depicted embodiment, each entry 226 includes an electronic device identifier 230, a structure vector 280, a feed link 235, and a feed available flag 240. The electronic device identifier 230 may uniquely identify the electronic device 105 of the entry 226. The structure vector 280 may be a vector normal to the digital image 130 and/or a portion of the digital image 130 captured by a camera 125 of the electronic device 105 as will be described hereafter.

The feed link 235 describes an address of an image feed from the camera 125 of the electronic device 105 associated with the entry 226. The feed link 235 may be used to access the digital image 130 of the electronic device 105 of the entry 226. The feed available flag 240 may indicate whether the feed link 235 is available to other electronic devices 105.

Figure 3C:
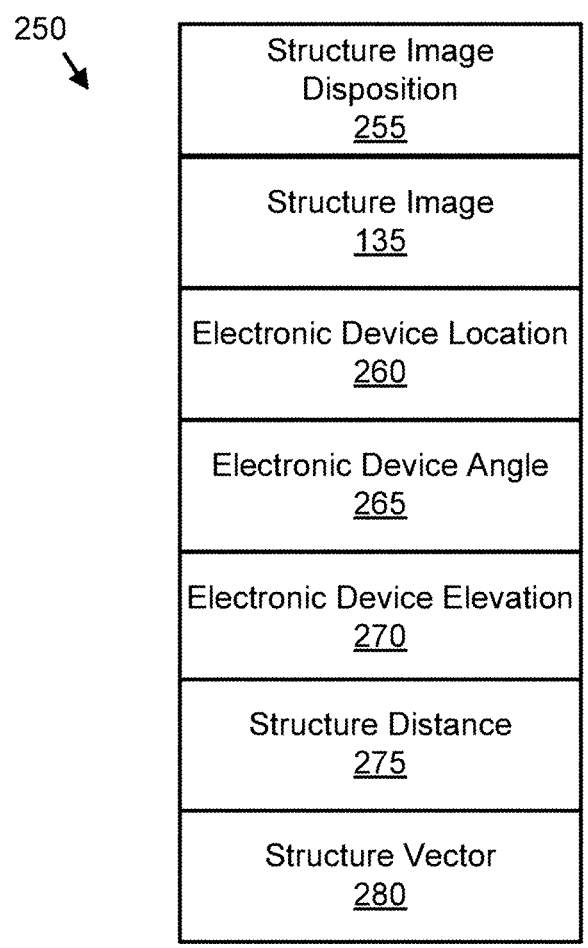
FIG. 3C is a schematic block diagram illustrating one embodiment of electronic device data.

FIG. 3C is a schematic block diagram illustrating one embodiment of electronic device data 250. The electronic device data 250 may be organized as a data structure and stored in a memory of the electronic device 105. The electronic device data 250 may be used to identify the structure image 135. In addition, the electronic device data 250 may be used to generate the structure vector 280. In the depicted embodiment, the electronic device data 250 includes a structure image disposition 255, the structure image 135, the electronic device location 260, an electronic device angle 265, an electronic device elevation 270, a structure distance 275, and the structure vector 280.

The structure image disposition 255 may specify the disposition of the structure image 135 within the digital image 130. In one embodiment, the structure image disposition 255 describes the pixels of the structure image 135. Alternatively, the structure image disposition 255 may describe a geometry of the structure image 135 within the digital image 130.

The structure image 135 may record the pixels of the selected structure image 135 with other pixels of the digital image 130 removed. The electronic device location 260 may be the GPS coordinates of the electronic device 105.

The electronic device angle 265 may be an angle of the electronic device relative to a reference vector. In one embodiment, the reference vector is a vertical vector. Alternatively, the reference vector may be a horizontal vector from the electronic device 105 to a North horizon. In a certain embodiment, the electronic device angle 265 is an angle of the electronic device 105 to a horizon. An accelerometer and/or gyroscope of the electronic device 105 may be used to determine the electronic device angle 265.

The electronic device elevation 270 may be the elevation of the electronic device 105 relative to sea level. A GPS of the electronic device 105 may determine the electronic device elevation 270. Alternatively, a barometer of the electronic device 105 may determine the electronic device elevation 270.

The structure distance 275 may be a distance to the structure of the structure image 135 from the electronic device 105. The structure distance 275 may be determined using a parallax angle between two cameras 125 of the electronic device 105 and/or one camera 125 electronic device 105 in two positions. Alternatively, the structure distance 275 may be determined using a laser rangefinder and/or echo rangefinder embodied in the electronic device 105.

The structure vector 280 may be generated using the structure image disposition 255, the structure image 135, the electronic device location 260, electronic device angle 265, electronic device elevation 270, and/or the structure distance 275. In one embodiment, the structure vector 280 includes an origin at the electronic device location 260. The structure vector 280 may be communicated to the electronic device database 225.

Figure 4:
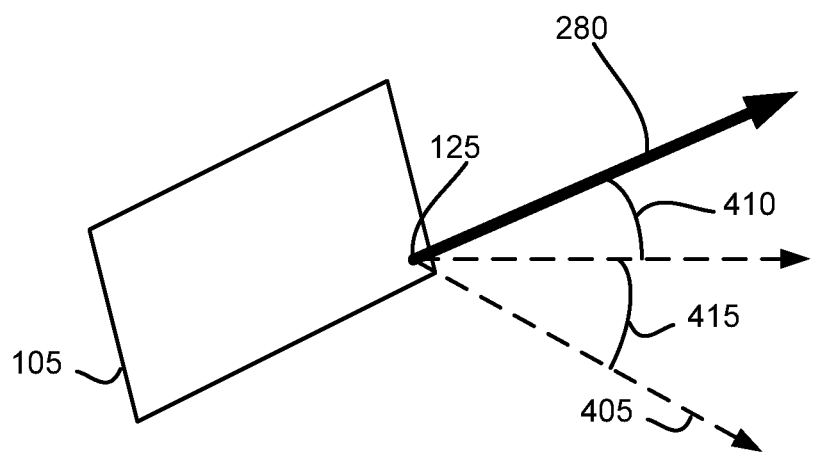
FIG. 4 is a perspective drawing illustrating one embodiment of a structure vector.

FIG. 4 is a perspective drawing illustrating one embodiment of the structure vector 280. The structure vector 280 may be calculated from the camera 125 of the electronic device 105. The structure vector 280 may be calculated relative to a reference vector 405 with an origin at the electronic device 105 and/or at the camera 125 of the electronic device 105.

The direction of the reference vector 405 may be calculated from an accelerometer of the electronic device 105 and the GPS coordinates of the electronic device 105. The GPS coordinates, the accelerometer, and/or a gyroscope of the electronic device 105 may be used to determine a vertical angle 410 and a horizontal angle 415 of the structure vector 280 relative to the reference vector 405. The vertical angle 410 and the horizontal angle 415 may also determine the electronic device angle 265. The length of the structure vector 280 may be the structure distance 275.

Figure 5:
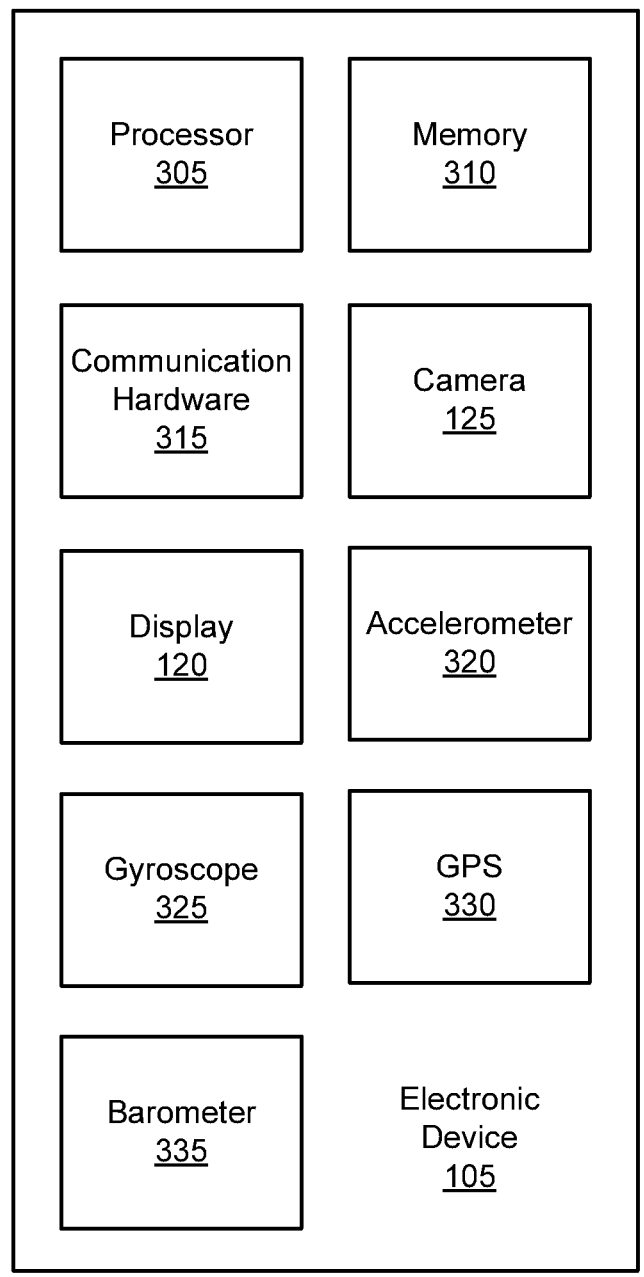
FIG. 5 is a schematic block diagram illustrating one embodiment of an electronic device.

FIG. 5 is a schematic block diagram illustrating one embodiment of the electronic device 105. The electronic device 105 includes a processor 305, a memory 310, communication hardware 315, the camera 125, the display 120, the accelerometer 320, the gyroscope 325, the GPS 330, and the barometer 335.

The memory 310 may be a semiconductor memory, a hard disk drive, an optical storage device, a micromechanical storage device, or combinations thereof. The memory 310 may store code. The processor 305 may execute the code. The communication hardware 315 may communicate with the network 115 and/or other devices. The camera 125, display 120, accelerometer 320, gyroscope 325, GPS 330, and/or barometer 335 may be embodied in the electronic device 105.

Figure 6:
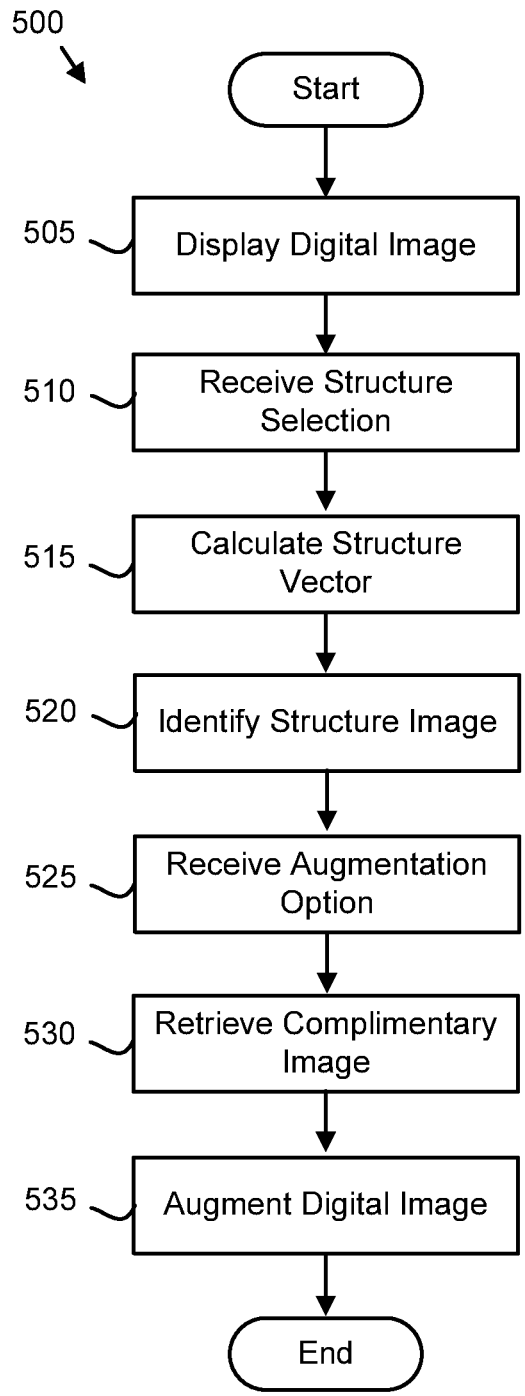
FIG. 6 is a schematic flow chart diagram illustrating one embodiment of a digital image augmentation method.

FIG. 6 is a schematic flow chart diagram illustrating one embodiment of a digital image augmentation method 500. The method 500 may augment the digital image 130 with the structure information 220 and/or by removing the structure image 135. The method 500 may perform the functions of the system 100 and/or electronic device 105. In one embodiment, the method 500 is performed by the processor 305. Alternatively, the method 500 may be performed by a program product. The program product may include a computer readable storage medium that stores code. The processor 305 may execute the code to perform the functions of the method 500.

The method 500 starts, and in one embodiment, the electronic device 105 displays 505 the digital image 130. The camera 125 may capture the digital image 130 and the display 120 may display 505 the digital image 130.

The code of the electronic device 105 may receive 510 a structure selection of the structure image 135. The user may make the structure selection by tapping on the structure image 135 on the display 120. Alternatively, the user may make the structure selection by outlining the structure image 135 on the display 120.

The code of the electronic device 105 may calculate 515 the structure vector 280. The structure vector 280 may be calculated 515 as a function of two or more of the structure image disposition 255, the electronic device location 260, the electronic device angle 265, the electronic device elevation 270, and/or the structure distance 275.

The code of the electronic device 105 may further identify 520 the structure image 135 in the digital image 130. In one embodiment, the structure image 135 is identified from the structure reference image 205 of the structure database 200. The electronic device 105 may identify a structure reference image 205 that matches the structure image 135. In one embodiment, the code uses the GPS coordinates of the electronic device 105 and the structure locations 210 of the structure database 200 to identify the structure database entries 201 that are within the localization distance of the electronic device 105. The code may further identify 520 the structure reference image 205 of the identified structure database entries 201 that matches the structure image 135.

Alternatively, the code may identify 520 the structure image 135 using the structure vector 280. For example, the code may identify a structure location 210 in the structure database 200 corresponding to the structure vector 280. In a certain embodiment, a structure location 210 at an end of the structure vector 280 is identified 520. Alternatively, a structure database entry 201 with a structure location 210 along the structure vector 280 and a structure reference image 205 that matches the structure image 135 is identified 520 as the structure image 135. The code may further identify 520 the structure image 135 by highlighting the structure image 135 and/or outlining the structure image 135 with a border 140.

The code of the electronic device 105 may further receive 525 the augmentation option 145. The augmentation options 145 may include displaying structure information 220, removing the structure image 135, and displaying a complementary image 165. In one embodiment, the electronic device 105 displays the augmentation options 145 and receives 525 a user selection of one or more of the augmentation options 145.

The code of the electronic device 105 may retrieve 530 a complementary image 165. The code may retrieve 530 the complementary image 165 in response to a selection of a display a complementary image augmentation option 145 and/or a remove the structure augmentation option 145.

In one embodiment, the code employs the structure vector 180 of the electronic device data 250 to identify an electronic device database entry 226 with a structure vector 280 that is directed towards a volume obscured by the structure of the structure image 135. Alternatively, the code may employ the structure vector 180 of the electronic device data 250 to identify electronic device database entry 226 with the structure vector 280 that is within the digital image 130.

The code may further employ the feed available flag 240 to determine if the feed link 235 of the identified electronic device database entry 226 is available. If the feed available flag 240 indicates that the feed link 235 is available, the code may retrieve 530 the complementary image 165 from the feed link 235.

The code of the electronic device 105 may further augment 535 the digital image 130 and the method 500 ends. The code may augment 535 the digital image 130 in response to the selection of an augmentation option 145. In one embodiment, the code augments 535 the digital image 130 by displaying the structure information 220 for the structure image 135. The structure information 220 may be displayed overlaying the structure image 135. Alternatively, the structure information 220 may be displayed adjacent to the structure image 135.

In one embodiment, the code augments 535 the digital image 130 by augmenting 535 the structure image 135 with the structure model 215. For example, the digital image 130 may be modified to show the interior layout of the structure of the structure image 135.

In an alternative embodiment, the code augments 535 the digital image 130 by removing the structure image 135 from the digital image 130. For example, the code may remove the pixels of the structure image 135 from the digital image 130. The code may also add the structure footprint 160 to the digital image 130 to indicate the location of the structure image 135.

In addition, the code may augment 535 the digital image 535 by displaying generated structures 175. The generated structures 175 may be generated by identifying structures that are obscured and/or partially obscured by the structure image 135. For example, the code may identify a first structure database entry 201 with a structure location 210 along the structure vector 280 of the electronic device data 250 that is beyond the structure location 210 of the structure of the structure image 135. The code may use the structure reference image 205 of the first structure database entry 201 to generate a generated structure 175. The generated structure 175 may be added to the digital image 130 to augment 535 the digital image 130.

The code may augment 535 the digital image 130 with a complementary image 165 from a second electronic device 105. In one embodiment, the complementary image 165 is matched to the display image 130. Elements that are missing from the display image 130 such as elements that are obscured by the structure image 135 may be added to the display image 130.

In an alternative embodiment, elements of the display image 130 may be enhanced using the complementary image 165. For example, if the complementary image 165 shows an element with a higher resolution than the display image 130, details of the complementary image 165 may be added to the display image 130. In one embodiment, if the user selects an element of the complementary image 165, the code may display the complementary image 165.

The embodiments identify the structure image 135 selected by a user in the digital image 130 displayed on the display 120 from the camera image of the camera 125. The embodiments further augment the digital image 130 to enhance the value of the digital image 130 to the user. In one embodiment, the digital image 130 is augmented with structure information 220 for the structure image 135. As a result, the user has ready access to information about the structure image 135.

Alternatively, the digital image 130 may be augmented by removing the structure image 135 from the digital image 130. As a result, the user is given the opportunity to "see" behind the structure image 135. In addition, the digital image 130 may be augmented with the complementary image 165, allowing the user to "see" details that are currently obscured by the structure image 135. Augmenting the digital image 130 with the complementary image 165 may allow the user to "see" details from the point of view of the second electronic device 105.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a camera;
a display that displays a digital image from the camera;
a processor;
a memory that stores code executable by the processor, the processor performing:
identifying a structure image of a given structure in the digital image;
generating a localized electronic device database in the memory, wherein the electronic device database comprises a structure vector, a feed link, and a feed available flag for each electronic device of a plurality of electronic devices that indicates if a camera of the electronic device is accessible, wherein the structure vector for each electronic device comprises an origin at a location of the electronic device and a vector end at the given structure;
identifying a second electronic device from the localized electronic device database that is viewing a portion of a scene obscured by the structure image;
accessing the camera of the second electronic device if the feed available flag is asserted for the second electronic device;
generating a complimentary image from the feed from the camera of the second electronic device; and
augmenting the digital image with structure information for the structure image, the digital image with the structure image removed, and the complementary image added to the digital image, wherein the structure information comprises a structure name, a structure occupant, a structure use, a structure address, a structure coordinate, a structure history, and a structure model.

2. The apparatus of claim 1, wherein the structure image of the given structure is identified from a structure reference image of a structure database.

3. The apparatus of claim 1, wherein the structure image of the given structure is identified using the structure vector applied to a structure database.

4. The apparatus of claim 3, wherein the structure vector is further calculated from two or more of an electronic device location, an electronic device angle, an electronic device elevation, and a structure distance.

5. A method comprising:
identifying, by use of a processor, a structure image of a given structure in a digital image displayed on a display from a camera image;
generating a localized electronic device database in the memory, wherein the electronic device database comprises a structure vector, a feed link, and a feed available flag for each electronic device of a plurality of electronic devices that indicates if a camera of the electronic device is accessible, wherein the structure vector for each electronic device comprises an origin at a location of the electronic device and a vector end at the given structure;

identifying a second electronic device from the localized electronic device database that is viewing a portion of a scene obscured by the structure image;

accessing the camera of the second electronic device if the feed available flag is asserted for the second electronic device;

generating a complimentary image from the feed from the camera of the second electronic device; and augmenting the digital image with structure information for the structure image, the digital image with the structure image removed, and the complementary image added to the digital image, wherein the structure information comprises a structure name, a structure occupant, a structure use, a structure address, a structure coordinate, a structure history, and a structure model.

6. The method of claim 5, wherein the structure image of the given structure is identified from a structure reference image of a structure database.

7. The method of claim 5, wherein the structure image of the given structure is identified using the structure vector applied to a structure database.

8. The method of claim 7, wherein the structure vector is further calculated from two or more of an electronic device location, an electronic device angle, an electronic device elevation, and a structure distance.

9. A program product comprising a non-transitory computer readable storage medium that stores code executable by a processor to perform:

identifying a structure image of a given structure in a digital image displayed on a display from a camera image;

generating a localized electronic device database in the memory, wherein the electronic device database comprises a structure vector, a feed link, and a feed available flag for each electronic device of a plurality of electronic devices that indicates if a camera of the electronic device is accessible, wherein the structure vector for each electronic device comprises an origin at a location of the electronic device and a vector end at the given structure;

identifying a second electronic device from the localized electronic device database that is viewing a portion of a scene obscured by the structure image;

accessing the camera of the second electronic device if the feed available flag is asserted for the second electronic device;

generating a complimentary image from the feed from the camera of the second electronic device; and augmenting the digital image with structure information for the structure image, the digital image with the structure image removed, and the complementary image added to the digital image, wherein the structure information comprises a structure name, a structure occupant, a structure use, a structure address, a structure coordinate, a structure history, and a structure model.

10. The program product of claim 9, wherein the structure image of a given structure is identified from a structure reference image of a structure database.

11. The program product of claim 9, wherein the structure image of a given structure is identified using the structure vector applied to a structure database.

12. The program product of claim 11, wherein the structure vector is further calculated from two or more of an electronic device location, an electronic device angle, an electronic device elevation, and a structure distance.

* * * * *